Patented June 8, 1954

2,680,724

UNITED STATES PATENT OFFICE 2,680,724

TEMPORARY PROTECTIVE COATINGS FOR FINISHED SURFACES FROM COMPOSITIONS COMPRISING AN AQUEOUS DISPERSION OF A PLASTICIZED POLYVINYL BUTYRAL

Richard D. Oppenheim, Roslyn Heights, N. Y., assignor to Spraylat Corporation, New York, N. Y., a corporation of New York No Drawing. Application January 14, 1952, Serial No. 266,451

2 Claims. (Cl. 260—23)

This invention relates to compositions consisting of aqueous dispersions of resinous polymeric materials and it has particular relation to new and improved compositions of this type, which are suitable for forming temporary protective coatings on painted surfaces.

The main object of the present invention is to provide compositions consisting of stable aqueous dispersions of a suitable resinous material, which, upon being applied to painted or finished surfaces and evaporation of water, form a stable and sufficiently resistant protective coating on said surfaces, without discoloring, softening or otherwise damaging them, and can be easily removed from said surfaces, for example by stripping, when protection is no longer required.

Another object of the present invention is to provide stable aqueous dispersions of the above mentioned type, which can be manufactured easily and inexpensively and can be diluted with water to the desired concentration, in which they are applied to the surface to be protected.

Other objects and the advantages of the invention will be apparent from the appended claims and the following specification which describes by way of example, and without limitation, some embodiments of the invention.

It has been known that painted or finished products are often damaged in manufacturing, shipping or installation, if handled without surface protection. For example, lacquered or enameled metal surfaces, such as electric panel boards or hollow metal doors, are often subjected to abuse during shipping or installation. The finish is easily damaged by scratches, dirt, plaster, or paint overspray. It is very difficult and costly to repair damaged areas, and almost impossible to match the exact color and gloss, and there is, therefore, a definite need to protect these finishes from being damaged. Gummed paper or paper and adhesive tape have been in use for providing protection, but these protective means have the disadvantage of being opaque, time-consuming in their application, difficult to keep on the surface during fabrication and exhibiting poor aging properties. The use of strippable plastic films offers definite advantages in that they can be quickly applied by spray gun, are transparent, and, since the film has adhesion over its entire area, they will remain in place during handling and fabrication. Furthermore, areas of the film can be cut without affecting the remainder of the coating. Such plastic coating must have sufficient elasticity and tensile strength to give sufficient protection and low enough adhesion to be readily stripped from the surface. The film must have good aging properties. The coating should not migrate into or attack the finish and the adhesion should not considerably vary with time. Since there is always a danger that organic solvents may attack the finished surface to be protected, the production of coatings from aqueous compositions is preferred. A water base offers also the advantage of being non-toxic, non-inflammable and low in cost.

I have now found that an aqueous dispersion providing films which meet all the above requirements, can be prepared if (a) plasticized polyvinyl butyral is used as plastic resinous material and (b) the plasticized polyvinyl butyral is converted into an aqueous dispersion by means of a dispersing agent corresponding to the formula $C_nH_{2n-10}SO_3Na$, wherein $n$ may range from 20–30, and having a molecular weight in the range of 400–600. Both conditions are indispensable in carrying out the present invention.

*Example I.*—100 parts by weight of polyvinyl butyral, 50 parts by weight of castor oil serving as plasticizer, and 15 parts by weight of a dispersing agent of the above formula and molecular weight, are placed in an internal mixer, for example a Werner and Pfleiderer mixer, heated to 280° F. and treated in the mixer for 45 minutes. Water is slowly added until a change of phase and formation of the dispersion occurs. This usually occurs when the batch contains about 35% of water. The dispersion can then be diluted to the desired concentration of solids, such as 35% to 60%, preferably between 40% to 50%. For example a total amount of 165 parts by weight of water is incorporated with the above mentioned amounts of resinous material, plasticizer and dispersing agent. The dispersion is then compounded with 16.5 parts by weight of soya lecithin, which serves as stripping agent, in order to make the film readily peelable from the surface, to which it is applied. To the composition, 0.2 part by weight of a 40% aqueous solution of formaldehyde are added as a preserving agent.

*Example II.*—The following ingredients are converted into an aqueous dispersion, substantially in the manner described in Example I:

| | Parts by weight |
|---|---|
| Polyvinyl butyral | 100 |
| Plasticizer consisting of dibutyl sebacate | 40 |
| Dispersing agent ($C_nH_{2n-10}SO_3Na$) | 15 |
| Polyoxyethylene glycol having a molecular weight of about 4000 | 2 |
| Water | 165 |

The dispersions thus obtained have neutral reaction and can be applied, preferably by spraying and subsequent evaporation of the water, to any kind of painted or finished surfaces to be protected, without the danger of damage to paints, finishes, or other sensitive base material. They form, after the evaporation of water from the sprayed dispersion, well adhering, sufficiently strong, water-resistant and durable, resilient coatings, and can be easily stripped or removed from the surfaces to be protected.

While the use of polyvinyl butyral in combination with the above described specific dispersing agent is indispensable in carrying out this invention, the latter is not limited to the use of the above mentioned specific ingredients. Furthermore, while the preferred plasticizer is castor oil, any other plasticizer for polyvinyl butyral can be used, if it is non-reactive to the lacquer, enamel or other finish of the surface to be coated. As examples of such plasticizers, in addition to dibutyl sebacate used in the above Example II, triglycol 2-ethyl butyrate and triglycol 2-ethyl hexoate are mentioned.

It will be also understood that the invention is not limited to the use of the specific steps, devices or other specific details described above and can be carried out with various modifications without departing from the scope of the invention, as defined in the appended claims. For example, stripping agents other than lecithin or solid polyoxyethylene glycols, may be used, and thickeners or stabilizers can be added to the compositions of the invention to impart them better sprayability or brushability, or the like.

The above described compound of the formula $C_nH_{2n-10}SO_3Na$ used as the dispersing agent in carrying out the present invention is prepared by direct treatment of petroleum with concentrated sulfuric acid containing free $SO_3$. In this treatment an acid sludge is obtained as a lower layer, while the upper layer contains sulfonic reaction products, which can be extracted from the upper layer and, upon distillation and purification yield compounds of the beforementioned formula. These compounds are marketed under the name "Petronate." Their preparation is described, for example, in U. S. Patent No. 2,518,439 of August 15, 1950.

The polyvinylbutyral resin used in carrying out the present invention belongs to the class of polyvinyl acetal resins and is obtained by condensation of butyraldehyde with polyvinylalcohol, obtained in turn by hydrolysis of polyvinyl acetate. The polyvinylbutyral resin is composed for example of

| | Per cent |
|---|---|
| Vinyl | About 54.4 |
| Butyraldehyde | About 38.3 |
| Acetate | About 0.3 |
| Hydroxyl | About 7.0 |

The term "stripping agent" is used in the present application to denote substances, such as lecithin or polyoxyethylene glycol, which are incorporated in the compositions embodying the invention in order to render the film readily peelable from the surface to which the composition is applied.

What is claimed is:

1. A composition for forming temporary strippable protective coatings on finished surfaces, comprising a plasticized polyvinyl butyral dispersed in water containing as dispersing agents mahogany sulfonates corresponding to the formula $C_nH_{2n-10}SO_3Na$, wherein $n$ is in the range of 20–30 and the average molecular weight is in the range of 400–600, said composition having a substantially neutral reaction and containing 2–16.5 parts of a stripping agent selected from the group consisting of soya lecithin and solid polyoxyethylene glycol, for 100 parts of the polyvinyl butyral.

2. A composition as claimed in claim 1, in which the plasticizer is castor oil.

References Cited in the file of this patent

UNITED STATES PATENTS

| Number | Name | Date |
|---|---|---|
| 2,340,358 | Young | Feb. 1, 1944 |
| 2,357,725 | Bennett | Sept. 5, 1944 |
| 2,389,796 | Mack | Nov. 27, 1945 |
| 2,443,893 | Collins | June 22, 1948 |
| 2,455,402 | Bromley | Dec. 7, 1948 |

OTHER REFERENCES

Bennett: "Concise Chemical and Technical Dictionary," Chemical Pub. Co., New York (1947), page 577.